Dec. 2, 1969  A. D. McBURNETT  3,481,346
CAR WASHING DEVICE
Filed May 31, 1966  3 Sheets-Sheet 1
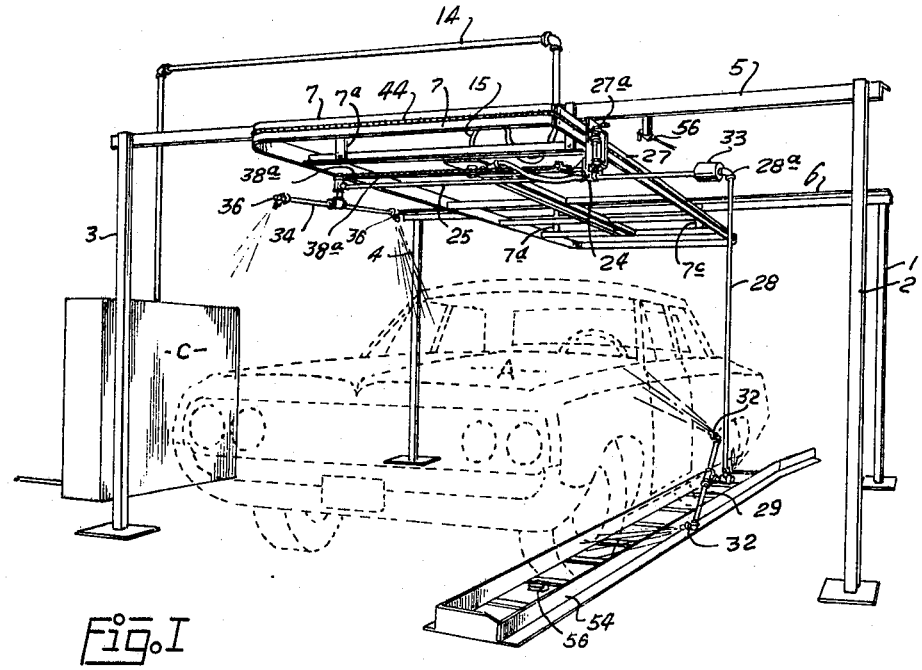
Fig. I
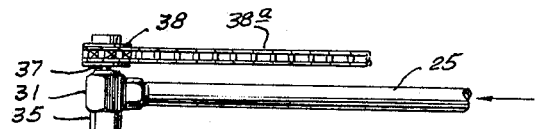
Fig. II
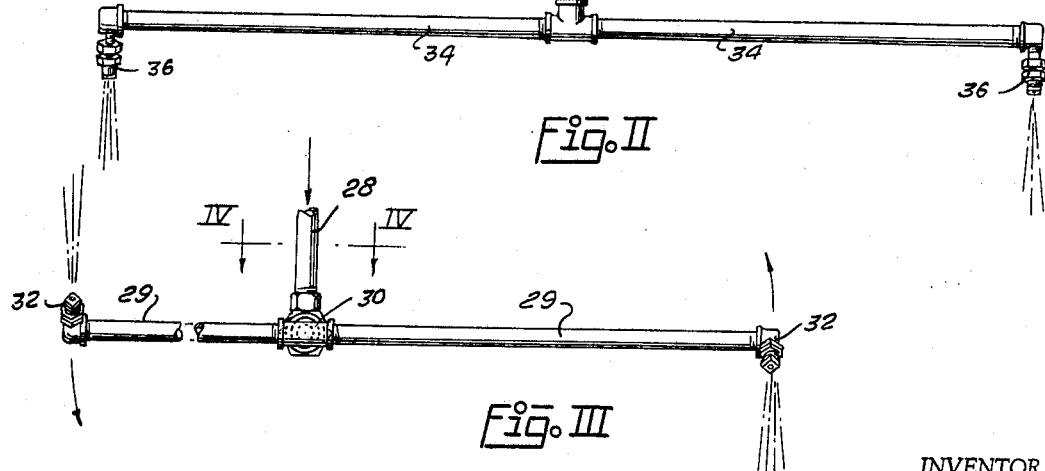
Fig. III
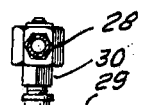
Fig. IV
INVENTOR
Arthur D. McBurnett
BY Howard E. Moore
ATTORNEY

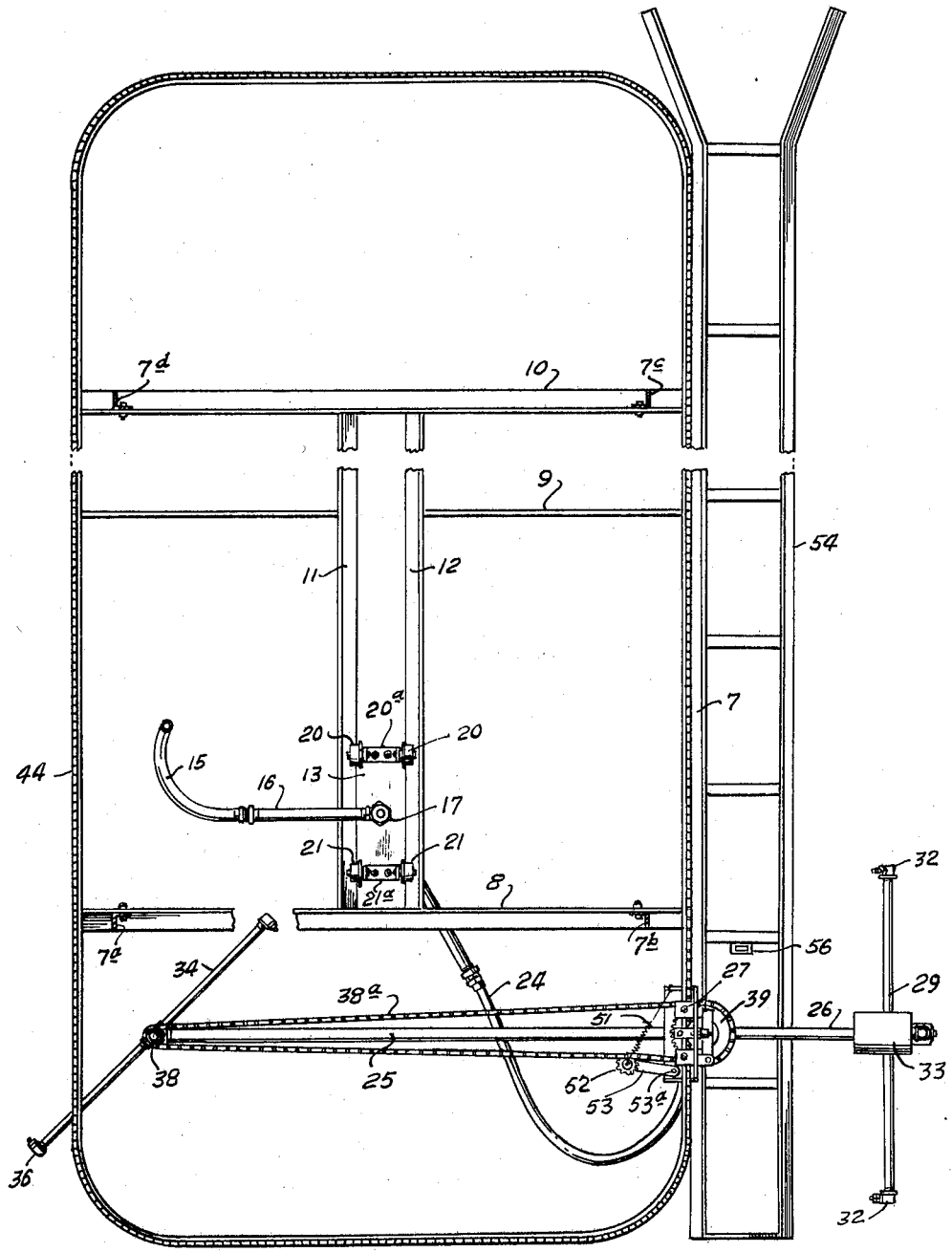

Dec. 2, 1969     A. D. McBURNETT     3,481,346
CAR WASHING DEVICE
Filed May 31, 1966     3 Sheets-Sheet 3
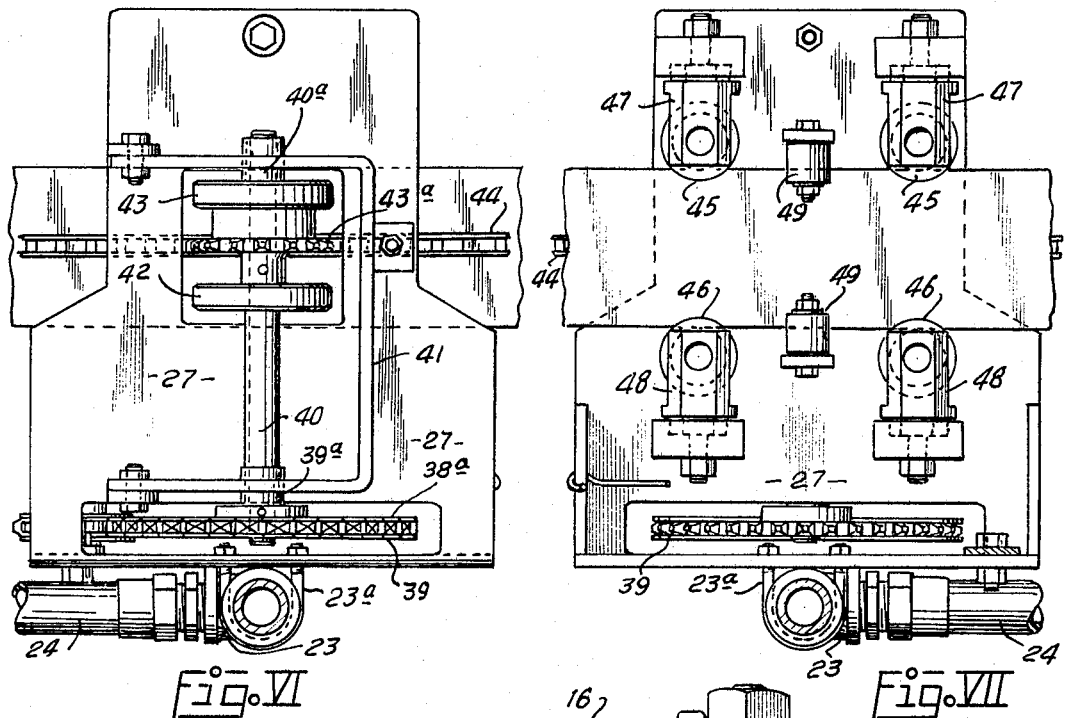
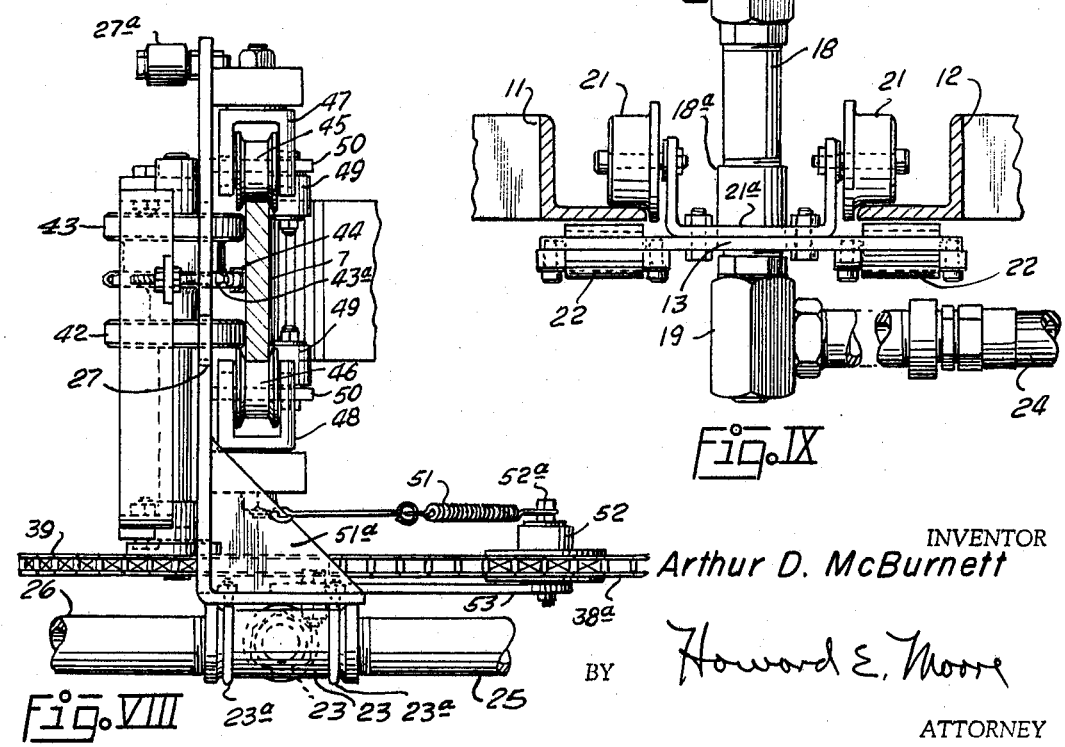
INVENTOR
Arthur D. McBurnett
BY Howard E. Moore
ATTORNEY United States Patent Office 3,481,346
Patented Dec. 2, 1969

3,481,346
CAR WASHING DEVICE
Arthur D. McBurnett, Dallas, Tex., assignor, by mesne assignments, to Automatic Car-Wash Distributors, Inc., Dallas, Tex., a corporation of Texas
Filed May 31, 1966, Ser. No. 553,999
Int. Cl. B60s 3/04
U.S. Cl. 134—45                    10 Claims

ABSTRACT OF THE DISCLOSURE

An automatic car washing device which includes a rectangular track frame on which is mounted a spray head carrier arranged to move about the track. Horizontal and vertical conduits extend from the carrier, each of which conduits has rotatable reaction spray heads thereon which are arranged to disperse spray against the top and sides of an automobile positioned under the track as the carrier moves about the track. A suitable drive means is provided for moving the carrier about the track. The drive means disclosed includes a drive chain extending about a drive sprocket mounted on one of the rotatable spray heads and a driven sprocket mounted on the carrier. A conduit carrier is movably mounted on the track frame and is arranged to move longitudinally thereof. Flexible fluid supply hoses are connected between the conduit carrier and the spray head carrier and between the conduit carrier and a fluid supply source so that the supply hoses may be moved longitudinally on the frame as the spray head carrier moves about the track frame.

This invention is concerned with a device for washing automobiles and is particularly concerned with the type of automatic car washing device which performs a complete car washing operation in a continuous cycle.

Automatic automobile washing devices have heretofore incorporated complex and complicated mechanisms including motor operated carriers, reversing circuits, timing and delay circuits, and other complex mechanical or electrical components which are not only expensive to manufacture and operate, but which are subject to repeated mechanical and electrical failure.

It is the primary object of the present invention to provide an automatic car washing device which is simple in structure and operation, economical to use, yet performs a superior washing operation on an automobile.

Another important object of the invention is to provide an automatic car washing device which utilizes the inherent force of the washing water caused by the ejection of water through nozzles disposed upon a rotatable spray head, eliminating the necessity for other motive power, such as an electric motor.

Still another object of the invention is the provision of rotatable spray heads in an automatic car washing device which are arranged to be conveyed over and about the surface of an automobile placed thereunder in such a manner as to cover the entire area of the outer side of the automobile, and which are moved by a common conveyor about a rectangular track disposed over the automobile by the force of water ejected through one of the spray heads.

Still another object of the invention is the provision of a water supply pipe support movable on a track on the conveyor frame which is moved back and forth on said track by the spray head carrier as it moves about a rectangular track disposed over an automobile being washed.

Other and further objects of the invention will become apparent upon reading the detailed specification hereinafter following and by referring to the drawings annexed hereto.

In the drawings,
FIG. I is a front perspective view of the car wash device showing a car positioned therein for washing,
FIG. II is a side elevational view of the driving spray head assembly,
FIG. III is a side elevational view of the side spray head assembly,
FIG. IV is a fragmentary top elevational view taken on the line IV—IV of FIG. III,
FIG. V is a top plan view of the car wash device,
FIG. VI is a side elevational view of the spray head conveyor assembly taken from the outer side of the conveyor track,
FIG. VII is a side elevational view of the spray head conveyor taken from the inner side of the conveyor track,
FIG. VIII is an end elevational view of the spray head conveyor, and
FIG. IX is an end elevational view of the water conduit carrier.

Numeral references are employed to designate the various parts shown in the drawings and like numerals indicate like parts throughout the various figures of the drawings.

Referring first to FIG. I of the drawings the car washing device includes a supporting frame made up of posts 1, 2, 3 and 4 and end cross-beams 5 and 6.

A substantially rectangular track frame 7 includes cross-braces 8, 9 and 10 and is suspended to the cross beams 5 and 6 by suspension arms 7a, 7b, 7c and 7d.

Spaced flanged track members 11 and 12 are secured between the cross braces 8 and 10. The track members 11 and 12 provide a track on which the water supply conduit conveyor 13 may move back and forth in the manner hereinafter described.

A water supply pipe 14 is connected in communication with the control box C. The control box C contains a pump and automatic cycling circuits and components for providing cycled dispersal of detergents and wash water, which are conventional and need not here be described in detail.

The cycle is concluded by a time delay switch (not shown) after the spray heads have passed about the car to starting position as shown in FIG. I.

A flexible conduit 15 is attached between the outer end of the supply conduit 14 and a swivel connection 17 on conduit conveyor 13 by means of a rigid pipe 16. The flexible conduit 15 is of sufficient length to allow the conduit conveyor 13 to traverse back and forth on the track rails 11 and 12 sufficiently to permit the spray head carrier 27, hereinafter described, to go completely around the rectangular track frame 7.

A cycle of operation is initiated by the front wheel of an automobile A engaging and energizing a switch 56 as the automobile is driven onto a guide track 54. Cycle change-over from a detergent cycle to a wash cycle is enabled through the provision of a switch activating arm 27a mounted on the spray head carrier 27 for movement therewith so as to engage a switch 56 fixedly attached to the conveyor track frame 7 as the carrier moves along the track frame.

The swivel connection 17 connects the pipes 16 and 18, said swivel connection being rotatable about a vertical axis to permit the carrier 13 to traverse back and forth on the track rails 11 and 12, as the swivel connection 17 rotates about its axis.

A conduit connection 18a is provided through the wall of the carrier 13 and is connected to a swivel connection 19 which in turn is connected by appropriate connections to a flexible conduit 24. The flexible conduit 24 is of sufficient length to allow the spray head carrier 27 to move about the track 7, and in turn pulls the conduit carrier 13 back and forth on the tracks 11 and 12 as the spray head carrier 27 moves about the rectangular track 7.

Pairs of rollers 20 and 21 are rotatably mounted on appropriate brackets 20a and 21a secured to the upper surface of the conduit carrier 13, said rollers being rotatably supported on the inwardly extending flanges of the tracks 11 and 12.

Rollers 22 (FIG. IX) are rotatably secured to the under side of the carrier 13 and are arranged to rotate against the under sides of the track rails 11 and 12 to support the carrier 13 against upward movement with relation to the track rails 11 and 12.

The flexible conduit 24 is connected to a T-coupling 23 which in turn is secured to the spray head carrier 27 by means of U-clamps 23a.

The rigid pipes 25 and 26 are attached to the coupling 23 and extend in opposite directions therefrom.

The pipe 26 extends laterally of the track frame 7 and is connected by an appropriate elbow coupling 28a to the vertically extending rigid pipe 28. The lower end of the pipe 28 is attached to a coupling 30 which in turn is attached to rotatable spray arms 29 which are arranged to rotate about a horizontal axis.

Spray head nozzles 32 are secured to the outer ends of the arms 29 and are turned in opposed directions so that upon ejection of water under pressure through said nozzles the spray head arms 29 are caused to rotate in the manner of a sprinkler head.

A counter-weight 33 is attached to the outwardly extending section of pipe 26 in such position as to balance the weight of the sprinkler head assembly 26, 28 and 29 and the sprinkler head assembly including the section of pipe 25 and the rotatable arm 34 as the device rotates about the track frame 7.

The section of pipe 25 is connected at its outer end to a connection 31 which in turn is connected to a swivel connection 35. The swivel connection 35 supports the spray head arms 34. Nozzles 36 are attached to the outer ends of the spray head arms 34 and are turned in opposed directions so that upon the ejection of water under pressure through the nozzles 36 the spray head arms 34 are caused to rotate. A shaft 37 extends through the connection 31 and is secured to the rotatable connection 35 so that when the spray head arms 34 rotate, the shaft 37 will be caused to rotate.

A sprocket 38 is secured to the shaft 37 so as to be rotated thereby.

A drive-chain 38a extends about the sprocket 38 and is rotated thereby. The drive-chain 38a also extends about a sprocket 39 which is mounted on a bearing 39a secured to the bracket 41 extending outwardly from the spray head carrier 27. The shaft 40 is attached to the bearing 39a so that the shaft is rotatable by the rotation of the sprocket 39. The shaft 40 extends through, and is secured to, the roller and sprocket assembly which includes the rollers 42 and 43 having a sprocket 43a secured therebetween. The upper end of the shaft 40 is mounted on a bearing 40a which in turn is secured to the bracket 41.

Chain track 44 is secured about the outer side of the track frame 7, and the sprocket 43a is arranged to interengage the chain track 44 as the sprocket 43a is rotated, to thereby move the spray head carrier 27 about the track frame 7.

The rollers 42 and 43 rotatably engage the outer surface the track frame 7 as the conveyor 27 moves therealong.

Spaced rollers 45 and 46 are rotatably mounted on appropriate support brackets 47 and 48 secured to the spray head carrier 27, said rollers being arranged to rotatably engage the outer edges of the track frame 7 to support the conveyor 27 thereon as it moves about the track frame 7.

Vertically disposed rollers 49 are rotatably disposed on appropriate brackets 50 attached to the spray head carrier 27. The rollers 49 are arranged to rotatably engage the outer surface of the track frame 7 to prevent sidewise movement of the carrier 27 with reference to the track frame 7.

An idler sprocket 52 is rotatably attached to the outer end of an arm 53 which is pivotally attached at 53a to the carrier 27. A spring 51 is attached between the gusset 51a secured to the carrier 27 and the axle 52a supporting the idler sprocket 52 in order to urge the idler sprocket against the chain 38a to hold same in engagement with the sprocket 39.

The operation and function of the device hereinbefore described is as follows:

The automobile A to be washed is driven under the car wash device with the wheels guided along the track 54. The front wheel of the automobile engages the switch 56 and energizes same to initiate the washing cycle. The water and/or detergent under pressure is admitted to the line 14 and passes through lines 16 and 24 to the spray head supply pipes 25, 26 and 28. The passage of the fluid through the restricted nozzle heads 36 and 32 causes the rotation of spray heads 29 and 34. The rotation of the spray head 34 causes the rotation of the sprocket 38 through the shaft 37 to rotate the chain 38a. The chain 38a in turn rotates the sprocket 39 which causes the rotation of sprocket 43a along the chain track 44. This moves the spray head carrier 27 along the track rail 7, which carries with it the spray heads 29 and 34. It will be noted that the spray head 34 rotates and dispenses water or detergent along the top outer side of the automobile, and that the spray head 29 dispenses water or detergent along the sides, front and rear of the automobile as it moves thereabout.

As the carrier 27 moves about the track 7 it will pull the conduit conveyor 13 back and forth along the tracks 11 and 12. As the carrier 27 moves along a side of the rectangular track frame 7 the spray head 34 will move along the opposite upper side of the automobile and the spray head 29 will move along the side of the automobile with the carrier 27. When the carrier 27 turns a corner and moves along the end of the track frame 7 the spray head 34 will be disposed substantially over the central portion of the top of the automobile to dispense spray thereon, and as the carrier again turns the corner to traverse the longer side of the frame 7 the spray head 34 will traverse the opposite side of the top of the automobile and dispense spray thereon, as the spray head 29 moves along the opposite side of the automobile.

When the carrier 27 reaches the switch 56, the arm 27a thereon engages the switch to energize same to change the detergent cycle to a rinsing cycle or vice versa. Normally the carrier 27 will move entirely around the track 7 on each detergent and rinsing cycle, and is stopped by a time delay circuit.

It will be seen that I have provided a car washing device which is economical to manufacture and operate, which is driven by power produced by ejection of fluid through the orifices of one of the spray heads and which does an effective job of washing the entire outer surface of the automobile.

Having described my invention, I claim:

1. In a vehicle washing device, a rectangular track frame; means to suspend the track frame above a vehicle; a conduit conveyor; guide means by which the conduit conveyor is movably supported within the rectangular track frame; a track about said track frame; a spray head carrier movably supported on the track frame arranged to move thereabout on said track; a source of fluid; a flexible conduit connecting the source and the conduit conveyor; a flexible conduit connecting the conduit conveyor and the spray head carrier; the said flexible conduits being in communication; laterally extending spray head supply pipes attached to the carrier and being in communication with the second named flexible conduit; one of said pipes being arranged to extend over the top of a vehicle and the other pipe having a downwardly extending portion arranged to extend downwardly along the side of the vehicle; a spray head on the outer end of each supply pipe rotatable by force of fluid ejected therefrom; and drive means including a drive train drivingly connecting the spray head attached to the pipe extending over the top of the vehicle to traction means on the carrier engaging the track to move the carrier about the track as the spray head attached to the pipe extending over the top of the vehicle rotates.

2. The combination called for in claim 1 with the addition of a guide track on the floor along one side of the frame to guide a vehicle thereunder.

3. The combination called for in claim 2 with the addition of a switch on the guide track arranged to be engaged by a wheel of the vehicle to activate the switch.

4. The combination called for in claim 1 wherein the drive train includes a sprocket on the sprinkler head; a sprocket on the carrier; a chain extending about the sprockets; and a driven sprocket rotated by the second named sprocket rotatable in mesh with the track on the track frame to move the carrier about the track frame.

5. In a vehicle washing device of the class described, a generally rectangular track frame supported by a supporting frame, a track attached to and extending about the frame; a spray head carrier movably supported on the track frame for movement along the track frame; traction means mounted on the spray head carrier and drivingly engaging the track for moving the spray head carrier therealong; a conduit extending from the carrier; a rotatable spray head on the conduit arranged to be rotated by fluid ejected through the spray head and to direct ejected fluid against the vehicle; drive means rotatable by the rotatable spray head and including a drive train operably connected between the spray head and the traction means for rotating the traction means to cause the spray head carrier to be drivingly moved along the track by rotation of the rotatable spray head and means to supply fluid to the conduit.

6. The combination called for in claim 5 wherein the means for supplying fluid to the conduit includes a conduit carrier; means carried by the frame to support the conduit carrier, said conduit carrier being movable on the said means, and a flexible pipe between the conduit carrier and the conduit.

7. The combination called for in claim 6 with the addition of a flexible pipe between the fluid supply means source and the conduit carrier.

8. The combination called for in claim 5 with the addition of a second conduit extending from the spray head carrier in communication with the first named conduit, and a spray head carried at the end of the second named conduit.

9. The combination called for in claim 1 with the addition of an arm on the spray head carrier, and a switch on the track frame engageable by the arm to actuate the switch.

10. In a vehicle washing device of the class described, a generally rectangular track frame suported by a supporting frame; a chain track attached to and extending about the track frame; a spray head carrier movably supported from the track frame for movement along the track; a first sprocket mounted for rotation on the spray head carrier; traction means mounted on the spray head carrier and including a second sprocket driven by said first sprocket and drivingly meshing with said track for moving the spray head carrier therealong; a conduit extending from the spray head carrier; a rotatable spray head on the conduit arranged to be rotated by fluid ejected through the rotatable spray head and to direct ejected fluid against the vehicle; drive train means including a third sprocket mounted on and rotatable by the rotatable spray head; a chain extending about said first and third sprockets so that rotation of the rotatable spray head causes said second sprocket to be driven by said first sprocket and to rotate in mesh with the track to cause the spray head carrier to move along the track; and means to supply fluid to the conduit.

References Cited

UNITED STATES PATENTS

| | | | |
|---|---|---|---|
| 1,831,223 | 11/1931 | Anstiss | 134—181 XR |
| 2,097,452 | 11/1937 | Dearborn | 239—192 XR |
| 2,751,249 | 6/1956 | Olson et al. | 239—192 XR |
| 2,896,644 | 7/1959 | Emanuel | 134—123 XR |
| 2,660,744 | 12/1953 | Cockrell | 134—123 XR |
| 2,896,857 | 7/1959 | Tompkins | 134—123 XR |
| 2,936,770 | 5/1960 | Emanuel | 134—123 |
| 3,167,797 | 2/1965 | Hergonson | 134—123 XR |
| 3,299,901 | 1/1967 | Axe et al. | 134—123 |

FOREIGN PATENTS

| | | |
|---|---|---|
| 1,204,773 | 1/1960 | France. |

OTHER REFERENCES

The Kwiki Whirlaway, Auto Laundry News, vol. 14, November 1965, p. 38.

ROBERT L. BLEUTGE, Primary Examiner

U.S. Cl. X.R.

134—181; 239—192